Feb. 17, 1948.  W. H. SILVER  2,436,155
POWER LIFT
Filed March 30, 1944  2 Sheets-Sheet 1
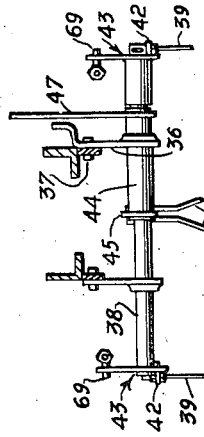
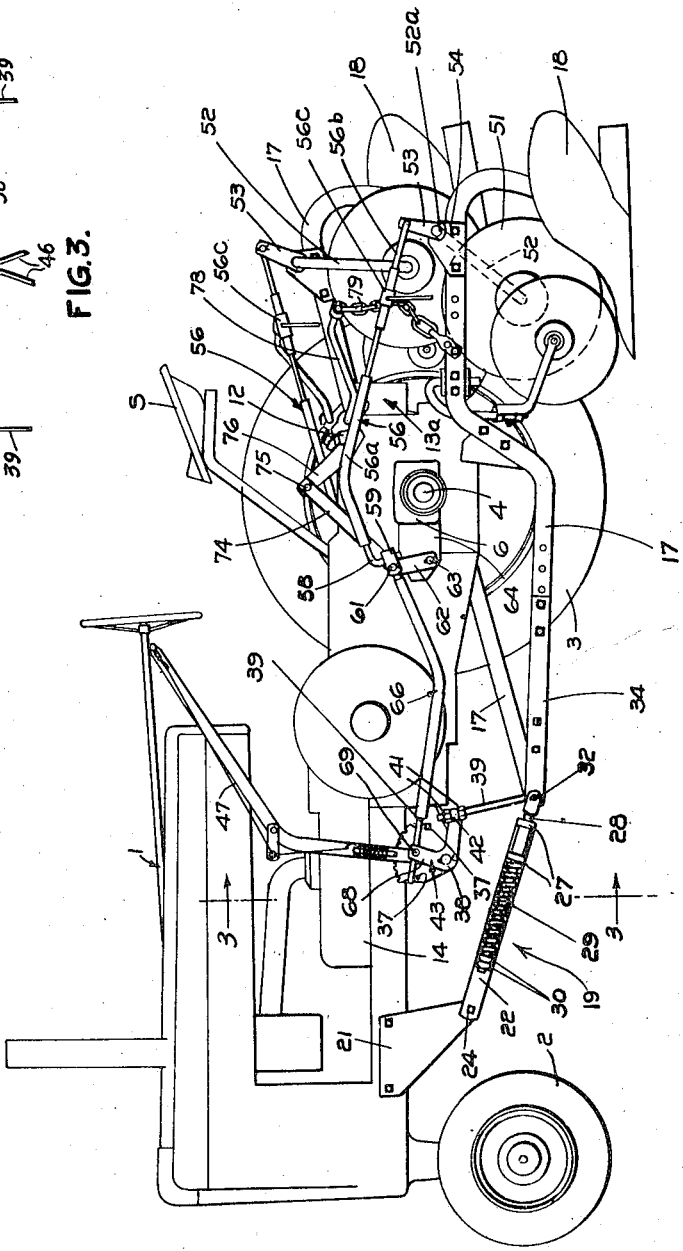
INVENTOR.
WALTER H. SILVER
ATTORNEYS

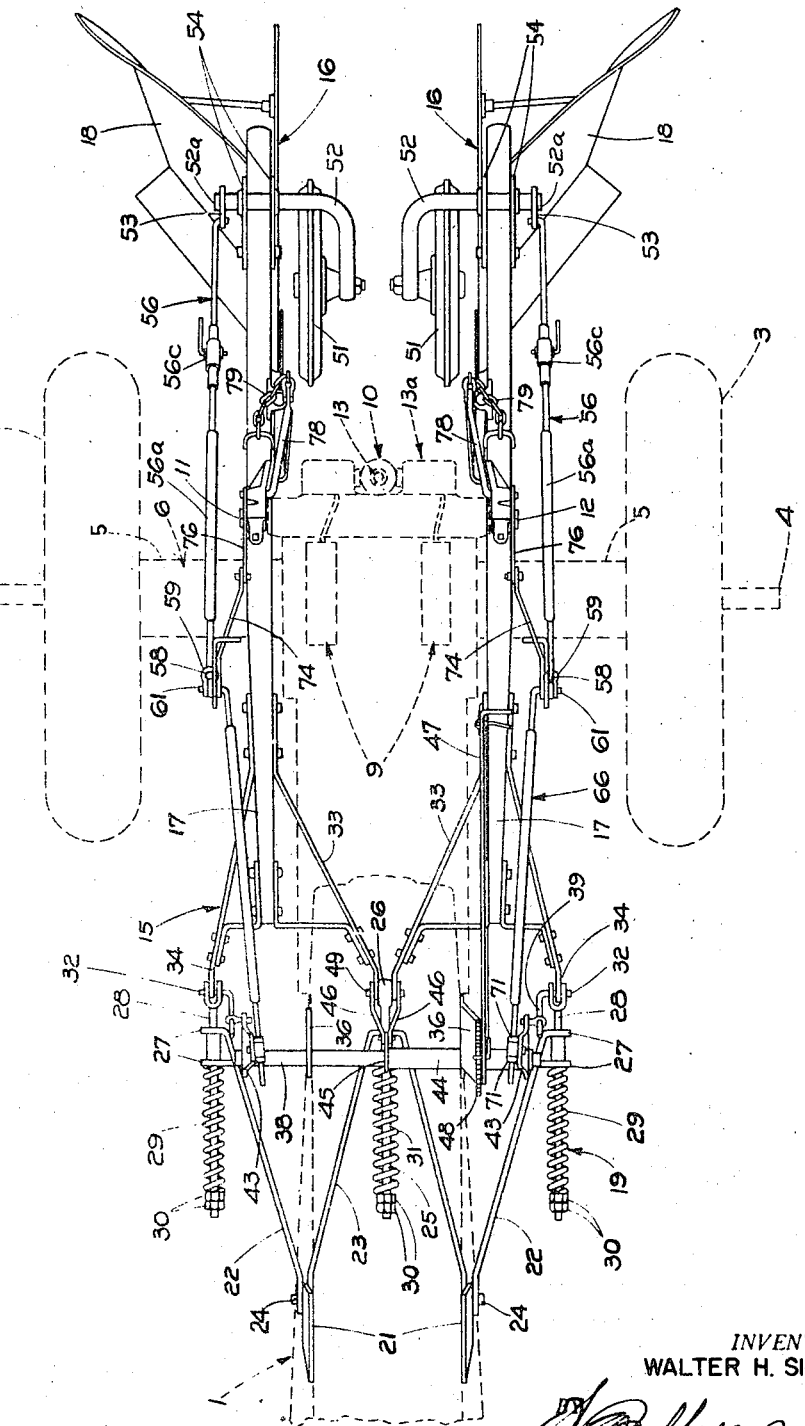

Patented Feb. 17, 1948

2,436,155

UNITED STATES PATENT OFFICE 2,436,155

POWER LIFT

Walter H. Silver, Moline, Ill., assignor to Deere & Company, Moline, Ill., a corporation of Illinois Application March 30, 1944, Serial No. 528,784

21 Claims. (Cl. 97—50)

The present invention relates generally to agricultural implements and more particularly to tractor-carried implements of the type known as integral equipment.

The object and general nature of the present invention is the provision of new and improved lifting and adjusting connections for an integral implement, such as a plow. More particularly, it is a feature of this invention to provide new and improved lifting and adjusting means for a two-way plow, incorporating separate hydraulically controlled lifting and adjusting means, one for each plow, in connection with a single or common leveling mechanism. Further, it is a feature of this invention to provide an earth working implement, such as a plow, with mechanism actuated whenever abnormal loads are encountered to reduce the operating depth momentarily. More specifically, it is a feature of this invention to provide means for raising both the front and rear ends of the tool beam whenever the tool on the latter is shifted rearwardly, as a result of an overload or for some other reason.

Another feature of this invention is the provision of an implement having a gauge wheel, with hitch means associated with the front end of the implement for yieldingly connecting the same to a source of power for propelling the same, in conjunction with means adapted when the hitch means yields for automatically raising the front end of the tool beam relative to the tractor and the rear end relative to said gauge wheel.

The present invention may be incorporated in a single bottom or two bottom tractor plow, or it may be incorporated in a two-way plow.

These and other objects and advantages of the present invention will be apparent to those skilled in the art after a consideration of the following description, taken in conjunction with the accompanying drawings, in which Figure 1 is a side view of a tractor mounted implement incorporating the principles of the present invention.

Figure 2 is a plan view of the implement shown in Figure 1.

Figure 3 is a detailed view of the hitch connections.

Referring now to the drawings, particularly to Figure 2, the tractor, which forms the supporting means for the implement or tool unit, is indicated in its entirety by the reference numeral 1 and includes a pair of closely spaced front wheels 2 and a pair of wide spaced rear traction wheels 3 mounted on axle shafts 4 that are carried in rear axle extensions 5 forming a part of the rear axle structure 6. The latter is secured to or forms a part of the frame of the tractor. The tractor 1 is equipped with a hydraulic power lift mechanism, indicated in its entirety by the reference numeral 10, and since such mechanism does not per se form a part of the present invention, the same has not been described in detail. Briefly, the lift mechanism 10 is substantially the same as that shown in U. S. Patent 2,416,373, issued February 25, 1947, to Theophilus Brown, and includes a pair of transversely aligned rockshaft sections 11 and 12, each controlled hydraulically through a dual piston and cylinder mechanism 9 by a hydraulic valve lever 13 forming a part of a hydraulic control valve mechanism 13a. Suitable follow-up linkage is included in the control unit 10 which, in conjunction with the valve lever 13, which is adjustable, provides for, first, moving either or both of the transverse rockshafts 11 and 12 into a number of different operating positions and, second, moving either or both rockshafts into a fully raised or fully lowered position, all under the control of the associated valve lever 13 and locked in that position. Fluid for operating the hydraulic mechanism just described is derived from any suitable source, such as a pump driven by the power plant 14 of the tractor.

The implement proper is indicated in its entirety by the reference numeral 15 and comprises a two-way plow including right and left hand units 16. The two units are substantially identical, except for being right and left hand, respectively, and therefore a description of one will suffice. Each right and left hand tool unit includes a tool beam 17 carrying at its rear end a furrow opener 18 and connected at its forward end by means of a yielding hitch 19 to a pair of draft brackets 21 fixed to the front of the tractor 1. The hitch 19 is arranged to receive both right and left hand units and includes two outer strap members 22 and a central V-shaped strap member 23, pivoted at 24 to the brackets 21 as best shown in Figure 1. The V-shaped member 23 is apertured to receive a longitudinally extending draft bolt 25 and each of the strap members 22 has a pair of apertured lugs 27 thereon through which the associated outer draft bolt 28 extends. Springs 29 and 31 are disposed about the draft bolts and are confined between forward adjusting nuts 30 and portions of the draft straps 22 and 23, as best shown in Figure 2. The rear ends of the draft bolts 28 are connected through suitable pivots 32 with front extensions 33 and 34 of the tool beams 17, these extensions diverging forwardly and spaced apart laterally a substantial distance at their front ends.

A pair of brackets 36 are fixed, as by bolts 37, to the tractor 1 and are apertured to receive a transverse rockshaft 38. A link 39 carries or forms the pivot 32 between the draft bolt 28 and the beam extension 34 and extends upwardly therefrom, being threaded at its upper end to receive a pair of adjusting nuts 41 which are disposed on opposite sides of a swivel eye 42 that is pivoted in one arm of a bell crank 43. The latter is rockably mounted on one end of the rockshaft 38, and the other bell crank 43 is fixed to the other end of the shaft 38, as best shown in Figure 3.

A sleeve 44 is disposed about the left hand portion of the shaft 38 and at its inner end carries an arm 45 connected by a pair of links 46 to the rear end 26 of the center draft bolt 25, to which the ends of the two forward beam extensions 33 are pivotally connected, as at 49. An adjusting lever 47 is fixed to the outer end of the sleeve 44 and operates adjacent a sector 48 connected with or forming a part of the associated bracket 36. The adjusting lever 47 extends upwardly and rearwardly so as to be accessible to an operator on the tractor seat S. The lever 47 is a leveling lever for both units 16 and when moved serves to raise or lower the links 46 so as to tilt each beam 17 toward one side or the other and thus may be used to level the furrow opener 18 in any operating depth.

Disposed adjacent one side of each furrow opener 18 is a gauge wheel 51 journaled on a downwardly and forwardly extending portion of a crank axle 52. The laterally outer end 52a of the latter has fixed thereto an arm 53, and the crank axle 52 is rockably mounted relative to the rear end of the beam 17 in a pair of brackets 54. A link member 56 is connected at its rear end with the upper end of the arm 53 and at its forward end is provided with a downturned portion 58 rockably mounted for lateral movement in a swivel block 59 which is pivoted on a pin 61 carried at the upper end of a fore and aft swinging arm 62, the lower end of which is apertured and pivotally mounted on a pin 63 carried by a bracket 64 fixed to the rear axle of the tractor. The link 56 preferably consists of two parts 56a and 56b connected together by a screw threaded adjusting member 56c. Turning the latter member in one direction or the other increases or decreases the effective length of the link 56. A front link 66 is pivotally connected at its rear end with the pin 61 and extends forwardly to a point adjacent the bell crank 43. The upwardly extending arm 68 of the bell crank 43 is apertured to receive a swivel pin 69, and the front end of the link 66 is screw threaded to receive lock nuts 71 which adjustably and pivotally connect the front end of the link 66 with the bell crank 43. A power lift link 74 is also pivotally connected at its front end with the pivot pin 61 and at its rear end is pivoted, as at 75, to an arm 76 that is fixed to one end of the power lift rockshaft 12. A second arm 78 is fixed at one end to the rockshaft 12 and at its rear end is connected by a chain 79 that normally is slack with the rear end of the tool beam 17.

The operation is substantially as follows.

When the operator desires to place either plow in operation, the control lever 13 is moved to the right or left and then rearwardly the amount necessary to select the desired operating depth. The depth of plowing may be increased or decreased by proper manipulation of the valve lever 13. If the plow that is in operating position should strike a hard spot or the draft effort increased to an abnormal degree, the springs 29 and 31 will yield in a rearward direction, permitting the links 39 and 46 to swing rearwardly. Since the points at which they are connected with the plow beam 17 lie rearward of the upper points of connection of the links 39 and 46, whenever the links swing rearwardly their lower ends will swing upwardly. Thus, whenever the springs 29 and 31 yield, the hitch point of the beam 17 is raised, the amount of upward movement corresponding to any given amount of yielding of the hitch depending upon the normal angular disposition of the links 39 and 46. This upward movement of the hitch point serves per se to cause the plow 18 to run up into a more shallow operating position. However, according to the principles of the present invention, this operation is augmented by the link connection 56, 66 between the gauge wheel and the tractor. Referring for the moment to Figure 1, it will be seen that whenever the hitch 19 yields rearwardly, the resulting rearward movement of the tool beam 17 will occasion a downward movement of the gauge wheel 51 relative to the tool beam 17, since the arm 53 remains connected with the tractor through the links 56 and 66. Thus, whenever the hitch yields, the gauge wheel 51 is moved downwardly relative to the plow bottom, which raises the latter into a more shallow operating position. Generally speaking, therefore, whenever the hitch connection yields, the operating position of the plow is automatically adjusted. Normally, the amount the rear end of the beam 17 is raised as a result of such action is somewhat greater than the amount the hitch point is raised, but this may be arranged as desired.

The operator may also increase or decrease the depth of operation by proper manipulation of the valve lever 13, which causes the power lift rockshaft 12 to be rocked in one direction or the other, and as will be clear from Figure 1, rocking of the power lift rockshaft 12 acts through the arm 76 and the link 74 to shift the links 56 and 66 in a generally longitudinal direction, thus raising both front and rear ends of the tool beam, whereby in an operating position the amount of suck of the plow bottom 18 remains substantially constant. It will also be noted from Figure 2 that since the links 56 and 66 extend generally longitudinally, the plow beam 17 may swing up and down with a relatively free floating action with respect to the tractor without materially affecting the depth of operation, thus enabling the outfit to traverse quite uneven ground without affecting the operation of the plow. Swinging the hand lever 47 in one direction, levels both plows. The separate power lift mechanisms, one for each plow, permits either or both to be raised or lowered, separately or together as desired, and specifically when one plow is down the other may be held in raised position without extraneous latches or the like.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural implement comprising the combination of supporting means, a tool beam, yieldable hitch means connecting the front end of said tool beam with the supporting means, a movable gauge wheel connected with the rear portion of said tool beam, and means connected with the supporting means and said tool beam for raising the hitch point of said tool beam and lowering said gauge wheel relative to said beam whenever said hitch means yields, as under an overload.

2. An agricultural implement comprising the combination of supporting means, a tool beam, yieldable hitch means connecting said tool beam with the supporting means, and means connected with the latter and said tool beam and including a ground contacting member movably connected with the beam for raising both ends of said tool beam whenever said hitch means yields, as under an overload.

3. An agricultural implement comprising supporting means, a tool beam, yieldable hitch means connecting said tool beam with the supporting means, means connected with the latter and said tool beam for raising the hitch point of said tool beam whenever said hitch means yields, as under an overload, a power unit on said supporting means, and connections from the power unit to the tool beam for raising both ends of said tool beam.

4. In a tractor mounted implement, the combination of a tool unit, yieldable means hitching said tool unit to the tractor, mechanism responsive to yielding of said hitch means for raising said tool unit into approximately parallel positions, said tool unit comprising a plow beam with a furrow opener connected with the rear end of said plow beam, and mechanism acting through at least a portion of said first mechanism for raising the rear portion of said plow beam and said furrow opener into a transport position.

5. The combination with a tractor having a power lift, of an integral implement adapted to be attached thereto and including a generally longitudinally extending tool beam, generally vertically shiftable draft means connecting the forward portion of said beam with the tractor, a gauge wheel movably mounted on the rear portion of said tool beam, means for raising or lowering the draft means and the front end of said beam, means including a generally rearwardly extending link connecting said tractor power lift and said gauge wheel, and means including a forwardly extending link connecting said raising and lowering means with said power lift.

6. An integral tractor plow adapted to be connected with a tractor having a power actuated lift adapted to be moved by power into any one of a plurality of operating positions and into a lifted position, said plow comprising a plow beam, generally vertically shiftable hitch means connecting the front end of said beam with the tractor, a gauge wheel swingably connected with said beam, means operatively connecting said gauge wheel with said power lift, means for raising and lowering the hitch point of said plow beam, means connecting the raising and lowering means with said power lift, and means operated by said power lift when it is moved into its lifted position for raising the rear end of said plow beam.

7. The combination of a tractor having a power lift unit including a part movable into and held in different positions, a longitudinally extending tool beam hitched to the tractor by means accommodating generally vertical movement of the tool beam relative thereto, mechanism actuated by movement of said power lift part through a portion of its range of movement for raising both front and rear end portions of said tool beam, and mechanism actuated by movement of said part through another portion of its movement for raising only the rear part of said tool beam.

8. The combination with a tractor having a power actuated part movable into different positions of adjustment and into a raised position, of a tractor mounted implement including a tool beam hitched to the tractor at its front end, a swingable arm adapted to be mounted on the tractor, a gauge wheel movably connected with the rear portion of said tool beam, a link extending forwardly from said gauge wheel to said arm, means for raising the front portion of said tool beam, a second link extending forwardly from said arm to said raising means, and a second arm adapted to be connected with said power actuated part and connected with the tool beam for raising the rear portion thereof by movement of said power actuated part into its raised position.

9. An agricultural implement adapted for use with a tractor having a power lift, comprising implement frame means, a cushion hitch for connecting said frame with the tractor, ground wheel means movably connected with said implement frame for controlling the depth of operation of the tool means thereof, means connected between the tractor power lift and said ground wheel means for adjusting the position of the latter when said implement frame moves relative to the tractor as a result of yielding of said cushion hitch, and means separate from said connecting means for raising said tool means into its transport position.

10. An integral plow adapted to be mounted on a tractor having a power lift, comprising a plow beam, a gauge wheel crank axle journaled for rocking movement on the rear portion of said plow beam and rearwardly of the tractor when the plow is attached thereto, a gauge wheel on said crank axle, a generally upwardly extending arm fixed to said crank axle, means connected with the power lift for raising and lowering the front end of said beam, and link means connecting the power lift with the arm on said crank axle.

11. The combination with a tractor having a power actuated part movable into different positions of adjustment and into a raised position, of a tractor mounted implement comprising a longitudinal tool beam, a pair of arms connected with said power actuated part, mechanism connected with one of said arms for adjusting the position of both ends of said tool beam by movement of said power actuated part into one or more of said different positions, and means connecting the other of said arms with the rear end portion of the tool beam for raising said rear end thereof relative to the front end.

12. In a tractor mounted implement, a tool beam, a furrow opener fixed to the rear end thereof, yielding means connecting said beam with the tractor, a gauge wheel movably connected with the rear portion of said beam, means including a generally longitudinally shiftable part connected with said gauge wheel for adjusting the position of said wheel relative to said furrow opener so as to govern the depth of operation of the latter, and means adapted for mounting on the tractor and movable into different positions relative thereto for holding said shiftable part in different positions of adjustment, so that when said yielding means yields and said beam moves rearwardly relative to the tractor said gauge wheel is moved into a position of lesser depth of operation.

13. A two-way plow comprising supporting means, a pair of tool beams, each having an inwardly disposed extension, one adjacent the other, yieldable hitch means connecting the front ends of said beams with said supporting means, raising and lowering means connected with the front and rear portion of each beam, means whereby said raising and lowering means acts to raise said beams when said hitch means yields, and common leveling means connected with said inwardly disposed extensions.

14. A tractor mounted two-way plow comprising a transverse shaft carried by the tractor, a pair of right and left hand plow units, each including a beam, a bell crank on each end of said shaft, said bell cranks being connected, respectively, with the front ends of said beams and one bell crank being movable relative to the other, a sleeve on said shaft and having an arm on the inner end thereof connected to both of said beams, and means for separately operating said bell cranks.

15. An agricultural implement comprising supporting means, a tool beam, yieldable hitch means connecting said tool beam with the supporting means, a power unit on said supporting means for raising said tool beam into a transport position, means connected with the latter and said tool beam for raising the hitch point of said tool beam whenever said hitch means yields, as under an overload, and means reacting against the power unit for raising the rear end of the tool beam relative to the ground whenever said hitch means yields, as under an overload.

16. A two-way plow comprising supporting means, a pair of tool beams, yieldable hitch means connecting the front ends of said beams with said supporting means, raising and lowering means connected with the front and rear portion of each beam, means whereby said raising and lowering means acts to raise said beams when said hitch means yields, and common leveling means also connected with the front ends of said beams.

17. An implement adapted to be attached to a tractor having a power lift, comprising a generally longitudinally extending tool beam, generally vertically shiftable draft means for connecting the forward portion of said beam with the tractor, a gauge wheel movably mounted on the rear portion of said tool beam, means for raising or lowering the draft means and the front end of said beam, means including a generally rearwardly extending link for connecting said tractor power lift and said gauge wheel, and means including a forwardly extending link for connecting said raising and lowering means with said power lift.

18. An agricultural implement adapted to be mounted on a tractor having a power lift, comprising a tool beam, a tool thereon, a first part adapted to be mounted on the tractor and connected with the forward portion of said beam, a second part adapted to be mounted on the tractor rearwardly of said first part and connected with the rear portion of said beam, and shiftable means interconnecting said parts and adapted to be operatively connected with said power lift so as to be actuated by a part of the movement thereof to raise and lower both ends of said beam and gauge the operating position of said tool.

19. An agricultural implement adapted to be mounted on a tractor having a power lift, comprising a tool beam, a tool thereon, a part adapted to be mounted on the tractor and connected with the forward portion of said beam, a gauge wheel assembly movably mounted for generally vertical movement on said beam, means interconnecting said part and said gauge wheel assembly for simultaneous adjustment, means for connecting said interconnecting means with the tractor power lift so as to gauge the operating position of said tool by the power lift, and means for connecting the rear portion of said tool beam with the power lift so as to raise the tool into a transport position by an operation of the power lift beyond the range of operation thereof which gauges the operating position of said tool.

20. An agricultural implement adapted to be mounted on a tractor having a power lift, comprising a tool beam, a tool thereon, means for gauging the depth of operation thereof comprising a gauge wheel assembly connected with the rear portion of said tool beam for generally vertical movement thereto and a part connected to raise and lower the front portion of said tool beam, means for lifting the rear portion of said tool beam and said gauge wheel assembly, and means deriving power from said tractor power lift for actuating said gauging means and said lifting means in succession.

21. An implement adapted to be attached to a tractor having a power lift, comprising a generally longitudinally extending tool beam, generally vertically shiftable draft means for connecting the forward portion of said beam with the tractor, a gauge wheel movably mounted on said tool beam, means for raising or lowering the draft means and the front end of said beam, means including a first link for connecting said tractor power lift and said gauge wheel, and means including a second link for connecting said raising and lowering means with said power lift.

WALTER H. SILVER.

REFERENCES CITED

The following references are of record in the file of this patent:

UNITED STATES PATENTS

| Number | Name | Date |
|---|---|---|
| 1,060,095 | Jonsson | Apr. 29, 1913 |
| 1,612,379 | Kauffman | Dec. 28, 1926 |
| 1,767,114 | Bashor et al. | June 24, 1930 |
| 1,893,619 | Geraldson | Jan. 10, 1933 |
| 2,306,814 | Knapp | Dec. 29, 1942 |
| 2,330,272 | Evans | Sept. 28, 1943 |
| 2,357,847 | Ray | Sept. 12, 1944 |
| 2,357,916 | Strandlund | Sept. 12, 1944 |
| 2,368,631 | Blalock | Feb. 6, 1945 |

FOREIGN PATENTS

| Number | Country | Date |
|---|---|---|
| 344,774 | Germany | May 2, 1918 |
| 370,631 | Germany | Oct. 29, 1920 |
| 473,798 | France | Oct. 15, 1914 |
| 503,186 | France | Mar. 10, 1920 |
| 715,269 | France | Sept. 22, 1931 |